US008743767B2

(12) United States Patent
Hyun et al.

(10) Patent No.: US 8,743,767 B2
(45) Date of Patent: Jun. 3, 2014

(54) METHODS OF OBTAINING SERVICE INFORMATION TO RECEIVE BROADCASTING SERVICE IN USER EQUIPMENT, AND SERVICE INFORMATION ANNOUNCEMENT METHODS PERFORMABLE IN SERVICE CENTER AND SERVER

(75) Inventors: Eun-hee Hyun, Daejeon-si (KR); Ho-choong Cho, Daejeon-si (KR); Jae-ho Kim, Daejeon-si (KR); Sang-ho Lee, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 1265 days.

(21) Appl. No.: 12/580,665

(22) Filed: Oct. 16, 2009

(65) Prior Publication Data
US 2010/0157872 A1    Jun. 24, 2010

(30) Foreign Application Priority Data
Dec. 19, 2008   (KR) .......................... 10-2008-0130699

(51) Int. Cl.
*H04H 20/71* (2008.01)
(52) U.S. Cl.
USPC ........................................................ 370/312
(58) Field of Classification Search
USPC ........................................................ 370/312
See application file for complete search history.

(56) References Cited

U.S. PATENT DOCUMENTS

| 8,064,820 B2 | 11/2011 | Hyun et al. |
| 2005/0170842 A1 | 8/2005 | Chen |
| 2008/0101271 A1* | 5/2008 | Kwon et al. .................. 370/312 |
| 2008/0253322 A1 | 10/2008 | So et al. |

FOREIGN PATENT DOCUMENTS

| EP | 1626525 A1 | 2/2006 |
| KR | 1020060015194 | 2/2006 |
| KR | 10-0812995 B1 | 3/2008 |
| WO | 19479 A1 | 5/1998 |
| WO | WO-2004/017579 A1 | 2/2004 |
| WO | 2006/025654 A1 | 3/2006 |
| WO | WO-2007/066975 A2 | 6/2007 |

(Continued)

OTHER PUBLICATIONS

Mohan, Uday et al., "Scalable Service Discovery in Mobile Ad Hoc Networks," Networking, N. Mitron et al. (Eds.), pp. 137-149 (2004).

(Continued)

*Primary Examiner* — Shripal Khajuria
(74) *Attorney, Agent, or Firm* — Nelson Mullins Riley & Scarborough LLP; Anthony A. Laurentano, Esq.; Matthew T. Fagan, Esq.

(57) ABSTRACT

Provided are a method of obtaining service information to receive a broadcasting service in a user equipment (UE), and service information announcement methods performable in a service center in charge of multimedia broadcast/multicast service (MBMS) control and a server interoperable with the service center. The method of obtaining MBMS information in a UE includes checking whether or not a previously defined event occurs in order to obtain service information, requesting an external server announcing service information to transmit service information according to whether or not the event occurs, and receiving service information transmitted in response to the service information transmission request and outputting the service information through a user interface (UI).

14 Claims, 6 Drawing Sheets

(56) References Cited

FOREIGN PATENT DOCUMENTS

| WO | 07/136400 A1 | 11/2007 |
|---|---|---|
| WO | 2008/035880 A1 | 3/2008 |
| WO | 2008/038912 A1 | 4/2008 |

OTHER PUBLICATIONS

European Search Report for Application No. 09173275.0, dated Sep. 28, 2010.

* cited by examiner ized. Also, since
METHODS OF OBTAINING SERVICE INFORMATION TO RECEIVE BROADCASTING SERVICE IN USER EQUIPMENT, AND SERVICE INFORMATION ANNOUNCEMENT METHODS PERFORMABLE IN SERVICE CENTER AND SERVER

CROSS-REFERENCE TO RELATED APPLICATION

This application claims the benefit under 35 U.S.C. §119 (a) of Korean Patent Application No. 10-2008-0130699, filed on Dec. 19, 2008, the disclosure of which is incorporated herein in its entirety by reference.

BACKGROUND

1. Field

The following description relates to a broadcasting service system, and more particularly, to a method of obtaining service information to receive a broadcasting service in a user equipment (UE) and service information announcement methods performable in a service center in charge of multimedia broadcast/multicast service (MBMS) control and a server interoperable with the service center.

2. Description of the Related Art

From the viewpoint of communication and broadcasting convergence, service techniques of transferring multimedia content through a mobile communication network by broadcasting or multicasting have been introduced and are already being implemented. As an example of the service techniques, an evolved multimedia broadcast/multicast service (EMBMS) is provided in a third generation partnership project (3GPP) mobile communication network. The EMBMS transmits a multimedia content packet obtained from a content provider (CP) or multicast broadcast (MB) source server, which is a data source, to a plurality of UEs through a mobile communication network by broadcasting or multicasting. In other words, an EMBMS service system transmits the corresponding content only once such that a plurality of users can simultaneously receive the content.

In such a point-to-multipoint service, resources of a mobile communication network may be saved because EMBMS content is transmitted once from a CP/MB source server to a broadcast/multicast channel shared by a plurality of UEs. In the point-to-multipoint service, content providers interoperate with an evolved broadcast multicast service center (eBM-SC) managing and controlling an EMBMS, and the eBM-SC interoperates with a packet data node (PDN) gateway (PGW) operating for a packet data service in a mobile communication network and multimedia broadcast multicast service 2 (MBMS2), such that multimedia content is transmitted to a terminal through the mobile communication network.

The EMBMS is frequently used in wireless communication network systems such as wideband code division multiple access (WCDMA) networks, and European mobile phone (e.g., a global system for mobile communication (GSM) phone) networks. In the EMBMS, a BM-SC, a network element defined for EMBMS management, simultaneously transfers content to several terminals using a packet core network for a conventional packet service and a bearer provided by an evolved universal mobile telecommunications system (UMTS) terrestrial radio access network (EUTRAN).

To provide multimedia broadcasting service through a mobile communication network, it must be known what service a terminal can use in a region. Thus, an eBM-SC must announce service information in order to inform a mobile terminal of an available broadcast/multicast service list and various information required to receive a related service. Using the announced information, the mobile terminal sets up its environment and provides the service list to a user, thereby enabling the user to select a desired specific EMBMS.

The announcement of service information may be performed in a mobile communication network using an EMBMS broadcast or multicast bearer, a service framework provided in a conventional mobile communication network, such as a multimedia messaging service (MMS), short message service (SMS), call broadcast service (CBS), and wireless application protocol (WAP), or a service method generally used to transfer documents between a web server and a client browser in a wired Internet network. While it is specified in the standards that these techniques can be applied to service information announcement, it is not specified in the standards how the techniques are applied.

When a user wants to use a specific service through a terminal in a mobile communication network or the terminal is moved to a new area, the terminal must obtain a list of services that can be provided in the area and information about the services from a service providing system and provide the list and information through a user interface (UI) such that a user can select one of the services.

In the above-mentioned methods other than the WAP technique and the method using a web server, service providing systems unilaterally transfer service information. In such a method in which a service providing system unilaterally transfers service information, the system must announce service information constantly, at a specific event, or at specific periods such that mobile terminals can obtain the latest service information. Thus, unless service information is constantly transmitted, the mobile terminals cannot obtain service information about the corresponding service area before a change is made in the service. When service information is frequently announced to solve this problem, a large amount of wireless resources are occupied. Also, the larger the amount of service information, the higher wireless resource occupancy is.

On the other hand, in the WAP technique or the method using a web server, a terminal requests service information from a system and obtains it. When the WAP technique or the method using a web server is applied, the terminal cannot know that or when service information has been changed, and thus must request service information in relatively short time intervals to obtain the latest service information. In this case, the power consumption of the terminal increases. Also, since all terminals must receive unicasted service information, the service providing system must respond to the respective requests of the terminals. Thus, the processing load of the system increases, and wireless resources are wasted.

SUMMARY

The following description relates to methods of obtaining and announcing service information to provide a broadcasting service in a wireless communication network, in which a service providing system announces service information according to predetermined time periods and an event in which a change is made in service, a terminal also requests service information when service information is needed, and thus the processing load of a service providing system and resource occupancy in a wireless resource section can be reduced.

The following description also relates to a method of obtaining service information to provide a broadcasting service in a wireless communication network, in which a terminal can obtain the latest service information that must be provided at the corresponding location even if the terminal moves between service areas.

According to an exemplary aspect, there is provided a method of obtaining multimedia broadcast/multicast service (MBMS) information to receive a broadcasting service in a user equipment (UE), the method including checking whether or not a predetermined event occurs in order to obtain service information, requesting an external server announcing service information to transmit service information according to whether or not the event occurs, and receiving service information transmitted in response to the service information transmission request, and outputting the service information through a user interface (UI).

According to another exemplary aspect, there is provided a method of obtaining service information to receive a broadcasting service in a user equipment (UE), the method including checking whether or not a predetermined event occurs in order to obtain service information, when the event occurs, determining a service information obtainment mode, when the service information obtainment mode is a mixed mode, determining whether to request an external server to transmit service information or wait to receive announced service information, according to the result of the determination operation, requesting the external server to transmit service information, or waiting to receive announced service information, and receiving service information transmitted in response to the service information transmission request or service information periodically announced by the external server, and outputting the service information through a user interface (UI).

According to still another exemplary aspect, there is provided a service information announcement method performable in a service center in charge of multimedia broadcast/multicast service (MBMS) control, the method including: storing service information describing newly generated, deleted or changed services according to service areas, announcing the newly stored service-area-specific service information to a service announcement server, and when a service announcement period is due or a change is made in service information, announcing the changed service information to a user equipments (UE) in a corresponding service area.

According to yet another exemplary aspect, there is provided a service information announcement method performable in a server interoperable with a service center in charge of multimedia broadcast/multicast service (MBMS) control, the method including mapping, storing, and managing MBMS information providable according to service areas that are sets of cells, receiving service information newly changed according to the service areas from the service center, and updating service-area-specific MBMS information, receiving a service information request message from a user equipment (UE), and searching for service information requested by the UE based on location information of the UE, and transmitting the service information to the UE.

Other objects, features and advantages will be apparent from the following description, the drawings, and the claims.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

For the following methods of obtaining and announcing service information, a multicast method in which information is transmitted only once and a plurality of terminals receive the information may be more efficient than a unicast method in which information must be transmitted as many times as the number of terminals receiving service. Thus, exemplary embodiments are under the assumption that service announcement is made using an evolved multimedia broadcast/multicast service (EMBMS) bearer or a cell broadcast service (CBS), and a method using an EMBMS bearer will be described. Needless to say, the concept of the exemplary embodiments can also be applied when a multimedia messaging service (MMS) or short message service (SMS), which employs the unicast method, is used. As an example, description will be made below with respect to the EMBMS that is a broadcasting service transferring multimedia content in a third generation partnership project (3GPP) mobile communication network by broadcasting or multicasting.

Figure 1:
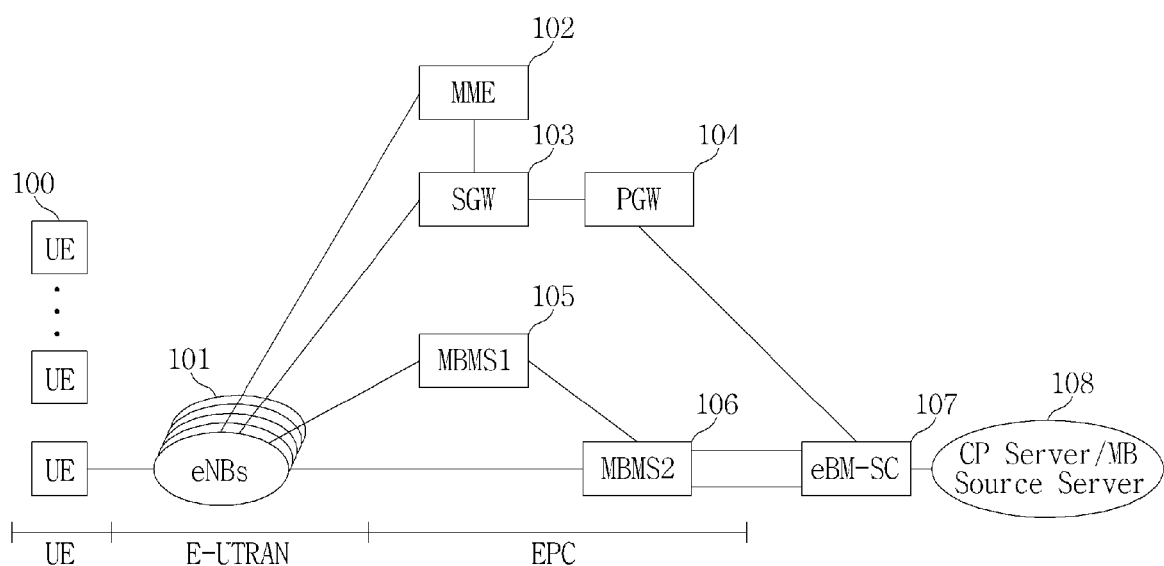
FIG. 1 is a block diagram of a system that provides an evolved multimedia broadcast/multicast service (EMBMS) based on a third generation partnership project (3GPP) mobile communication network (a wideband code division multiple access (WCDMA) network).

FIG. 1 is a block diagram of a system that provides an EMBMS based on a 3GPP mobile communication network (wideband code division multiple access (WCDMA) network). The block diagram is modeled after a structure defined in Release 8, 2008 standard. However, exemplary embodiments can be applied to systems of previous versions and systems that will be suggested in the future.

Referring to FIG. 1, a 3GPP mobile communication network includes a plurality of user equipments (UEs) 100 that receive broadcasting multimedia content packets, a universal mobile telecommunications system (UMTS) terrestrial radio access network (UTRAN) that includes a plurality of eNodeBs 101 in charge of wireless resource management and wireless channel setup for wireless transmission with the UEs 100, an evolved packet core (EPC) that interoperates with the UTRAN to control a packet service and take charge of traffic transmission and reception to/from outside of the network, and an evolved broadcast multicast service center (eBM-SC)

107 that is a control system to provide the EMBMS. The network components described above manage services that can be provided according to service areas, and set up and manage a session and bearer for transferring content received from an external content provider (CP) 108, thereby transferring the multimedia content to the UEs 100 at designated points in time.

The eNodeBs 101 constituting the EUTRAN receive uplink signals transmitted from the UEs 100 at the physical layer level, and transmit downlink signals to the UEs 100. In other words, the eNodeBs 101 exchange signals with the UEs 100 and serve as access points of the UEs 100. The eNodeBs 101 manage wireless resources in units of cells, thereby communicating with the UEs 100 in the corresponding cells through a wireless channel.

The EPC includes network elements such as a mobility management entity (MME) 102 that performs service control for general packet data service and manages a traffic path, a serving gateway (SGW) 103, a packet data node (PDN) gateway (PGW) 104, and a multimedia broadcast/multicast service 1 (MBMS1) 105 and MBMS2 106 that perform service control for supporting an EMBMS and manage a traffic path. And, the EPC performs session management for each service and interoperates with the UTRAN to set up a mobility management wireless bearer. The MME 102, the SGW 103 and the PGW 104 provide a unicast bearer function for performing a packet data service through the mobile communication network, and the MBMS1 105 and the MBMS2 106 provide a multicast bearer function for the EMBMS.

Meanwhile, the eBM-SC 107 is a node in charge of EMBMS control, and must be included as a functional element of a WCDMA system to provide the EMBMS. The eBM-SC 107 manages and controls the EMBMS to prepare service for EMBMS UEs and transfer service information. The eBM-SC 107 manages EMBMS subscribers and service information, authorizes an EMBMS bearer service in the mobile communication network, begins the EMBMS, plans to transfer EMBMS information, and transfers the EMBMS information. Also, the eBM-SC 107 provides a service announcement service that transfers service types that a UE can receive in the corresponding region, a type of content to be received from the corresponding service, and parameters required for communication. The eBM-SC 107 is connected with the MBMS2 106 in order to provide the EMBMS to the UEs 100.

An MBMS is provided according to regions, and an area to which one MBMS is provided is referred to as a service area (SA) of the MBMS. A SA to which an MBMS will be provided may have various sizes, such as a cell area unit, one eNodeB area unit, an MBMS1 coverage area unit, and an MBMS2 coverage area unit, and different SAs can overlap each other.

An Internet protocol (IP) interface used when the MBMS2 106 accesses the external Internet is used as an interface between the eBM-SC 107 and the MBMS2 106. The eBM-SC 107 serves as an entry point of the CP/multicast broadcast (MB) source server 108 to transfer EMBMS information, and may serve as a CP by itself.

The CP 108 denotes a node having an application function for content transfer. The MB source server 108 is a node such as a storage storing content only, or a file transfer protocol (FTP) server.

Each of the UEs 100 provides a list of services that a user can receive in the corresponding region and the detailed information using EMBMS information (i.e., service information) received from the eBM-SC 107, and enables the user to select a desired EMBMS using the provided list and information. When the user selects a specific EMBMS using such a function, the eBM-SC 107 performs a process of joining the UE 100 in a multicast group for the corresponding service.

After the UE 100 registers a request for receiving the corresponding EMBMS in the eBM-SC 107, it receives the corresponding EMBMS content from the eBM-SC 107 when the EMBMS begins.

According to EMBMS control, the eBM-SC 107 transfers EMBMS content from the CP/MB source server 108 to the UEs 100 in the corresponding SA via the MBMS2 106, the MBMS1 105, and the eNodeBs 101 through a shared channel used in the corresponding SA.

The EMBMS is a broadcasting multicast service, which transmits content from the CP/MB source server 108 to the authorized UEs 100 that have requested the EMBMS through a distribution tree consisting of links of nodes below the MBMS2 106 according to the broadcasting schedule of the EMBMS and control of the eBM-SC 107.

Figure 2:
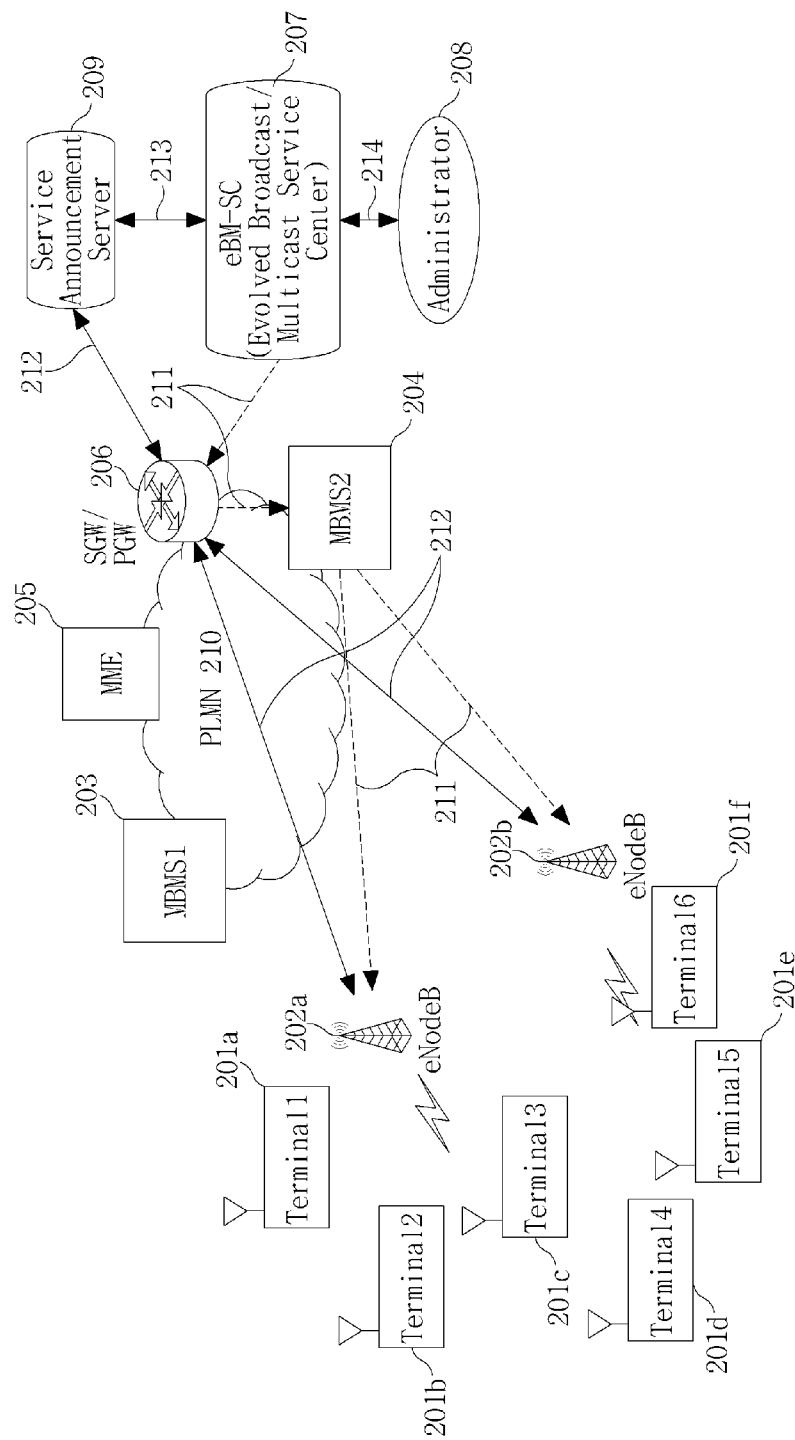
FIG. 2 illustrates a service announcement process for providing an EMBMS in a 3GPP network according to an exemplary embodiment.

FIG. 2 illustrates a service announcement process for providing an EMBMS in a 3GPP network according to an exemplary embodiment. In FIG. 2, dotted lines 211 denote service announcement flows generated when a system unilaterally provides service information, and solid lines 212 denote service announcement flows generated when terminals 201a to 201f request service information at their desired time points.

First, the service announcement flows 211 in which a system unilaterally provides service information will be described below.

An eBM-SC 207 in charge of EMBMS management and control begins a service announcement procedure according to a predetermined process at a designated service announcement period or when a change is made in service information. The eBM-SC 207 obtains service information that will be provided by the system based on online service registration or offline service registration 214 made by an administrator 208. The eBM-SC 207 performs a session establishment process in association with an MBMS1 203 and an MBMS2 204 in order to transfer service information through an EMBMS bearer, and the MBMS1 203 performs a control process together with eNodeBs 202a and 202b in order to set up a wireless bearer. When a common channel for transferring service information to terminals is prepared through the control process, the eBM-SC 207 transmits 211 service information in the form of traffic.

The service announcement flows 212 generated when terminals request service information at their desired time points will be described now. When one of the terminals 201a to 201f determines that service information is necessary, the terminal requests a list of services that can be received in the corresponding area and information about the services from a service announcement server 209 storing service information. Then, the service announcement server 209 provides service information in response to the request. Here, the server 209 storing service information may be a web server or a wireless application protocol (WAP) server, and the service information request and the service information are transmitted and received through a unicast default bearer. In a mobile communication system, an additional process is performed by an SGW/PGW 206, an MME 205, and the eNodeBs 202a and 202b to set up the default bearer.

Figure 3:
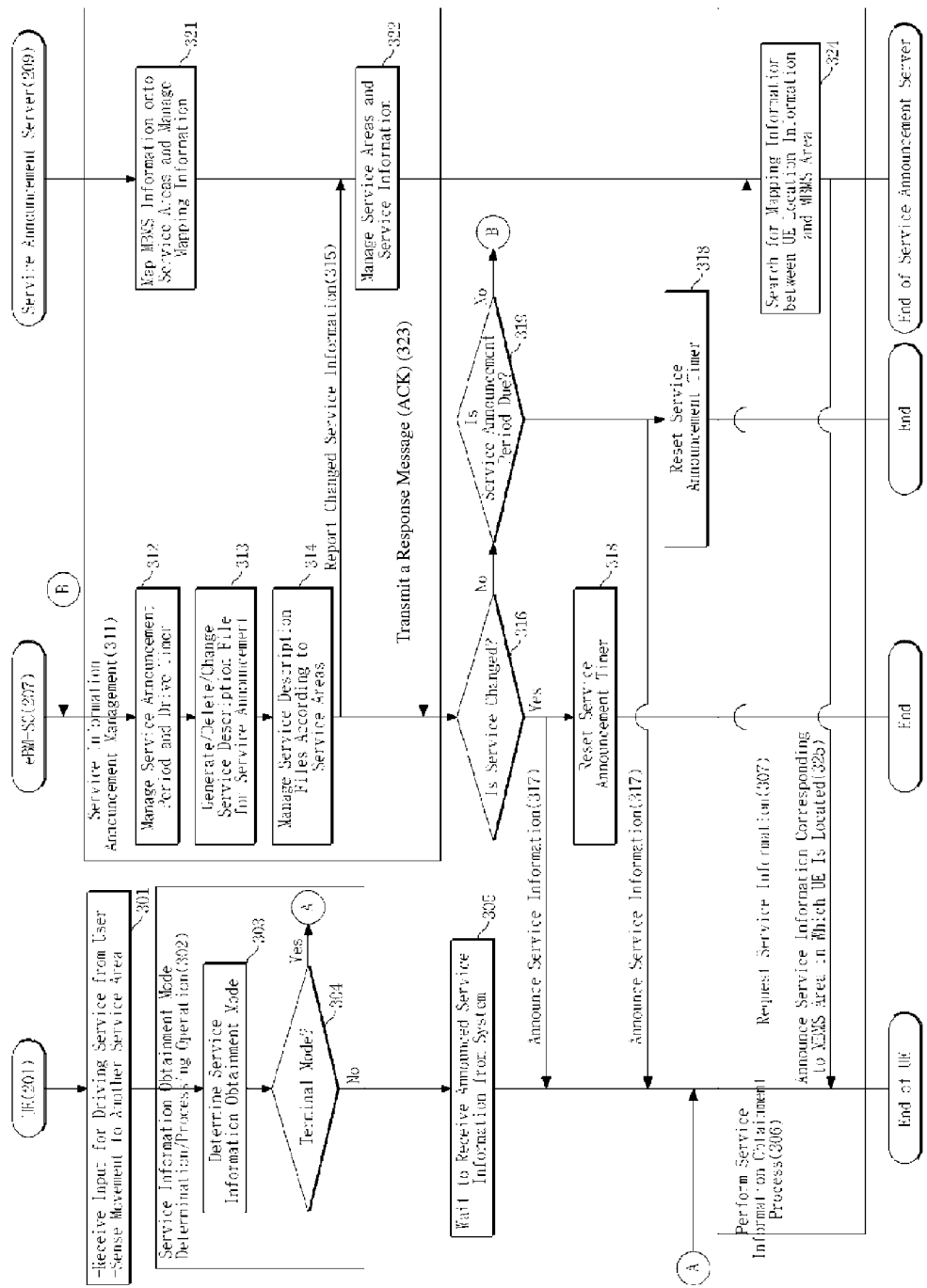
FIG. 3 is a flowchart illustrating a method of obtaining and announcing service information according to an exemplary embodiment.

FIG. 3 is a flowchart illustrating a method of obtaining and announcing service information according to an exemplary embodiment. To be specific, FIG. 3 is a message flow diagram among a UE 201, an eBM-SC 207, and a service announcement server 209 managing service information.

Referring to FIG. 3, when the UE 201 determines that the latest service information is necessary at the corresponding point in time because the user executes an EMBMS or the UE 201 moves to another SA (operation 301), it performs a service information obtainment mode determination and processing operation (operation 302).

In the service information obtainment mode determination and processing operation, the UE 201 obtains service information according to a set service information obtainment mode. For example, in a passive mode, the UE 201 may only receive service information unilaterally transmitted by the eBM-SC 207, and in a terminal mode, the UE 201 may receive service information only when it requests service information. Also, the two methods may be used together as in an exemplary embodiment. The case in which the two methods are used together is defined as a mixed mode. The mixed mode will be described later with reference to FIG. 4. According to the situation of a terminal system, the passive mode, the terminal mode, or the mixed mode may be applied, and also reference values may be applied to respective systems employing the respective methods.

When the service information obtainment mode is the terminal mode, the UE 201 performs a service information obtainment process in operation 306. To this end, the UE 201 transfers its location information and a message requesting the service announcement server 209 to transmit service information (operation 307), and obtains service information of the corresponding area from a response of the service announcement server 209 (operation 325). At this time, the service announcement server 209 storing and managing service information searches for information about services that can be used in the SA in which the UE 201 requesting service information is located (operation 324) and then provides the information to the UE 201. The location information provided by the UE 201 is an identifier of a position at which the UE 201 is located, and may be various forms of information, such as geological coordinates of the position, a cell identifier, and a SA identifier, that can be collected through a variety of interfaces.

When it is determined in operation 304 that the service information obtainment mode is not the terminal mode but the passive mode, the UE 201 waits to receive service information from the system (operation 305). When a change is made in service (operation 316) or a service announcement period is due (operation 319), the eBM-SC 207 transmits service description files in which the change is described, that is, service information to the UE 201 (operation 317), and resets a timer counting a time left until service announcement (operation 318). The service announcement period, which is system information, is a value that can be changed by an administrator according to a state of the system. The service announcement period is managed by the eBM-SC 207, and the timer for the service announcement period is driven (operation 312).

Meanwhile, the eBM-SC 207 and the service announcement server 209 need to particularly interoperate with each other such that the UE 201 obtains service information at a point in time. This is because service information transferred through service announcement of the eBM-SC 207 must be the same as service information obtained by a request of the UE 201 at all times. Thus, when a service is added, deleted, or changed, the eBM-SC 207 that actually performs service registration and management reflects the event in service description files (i.e., service information) managed according to SAs (operations 313 and 314). And, the eBM-SC 207 reports the service description file change information as service information to the service announcement server 209 (operation 315), and the service description file change information is reflected in an information file in the service announcement server 209 (operation 322).

The service announcement server 209 informed of service information change by the eBM-SC 207 manages MBMS information according to SAs (operation 322), and transmits a response message to the eBM-SC 207 (operation 323). When stability is ensured between the two nodes, the response message operation may be omitted.

Operation of the UE 201 when the service information obtainment mode is the mixed mode will be described below with reference to FIG. 4.

Figure 4:
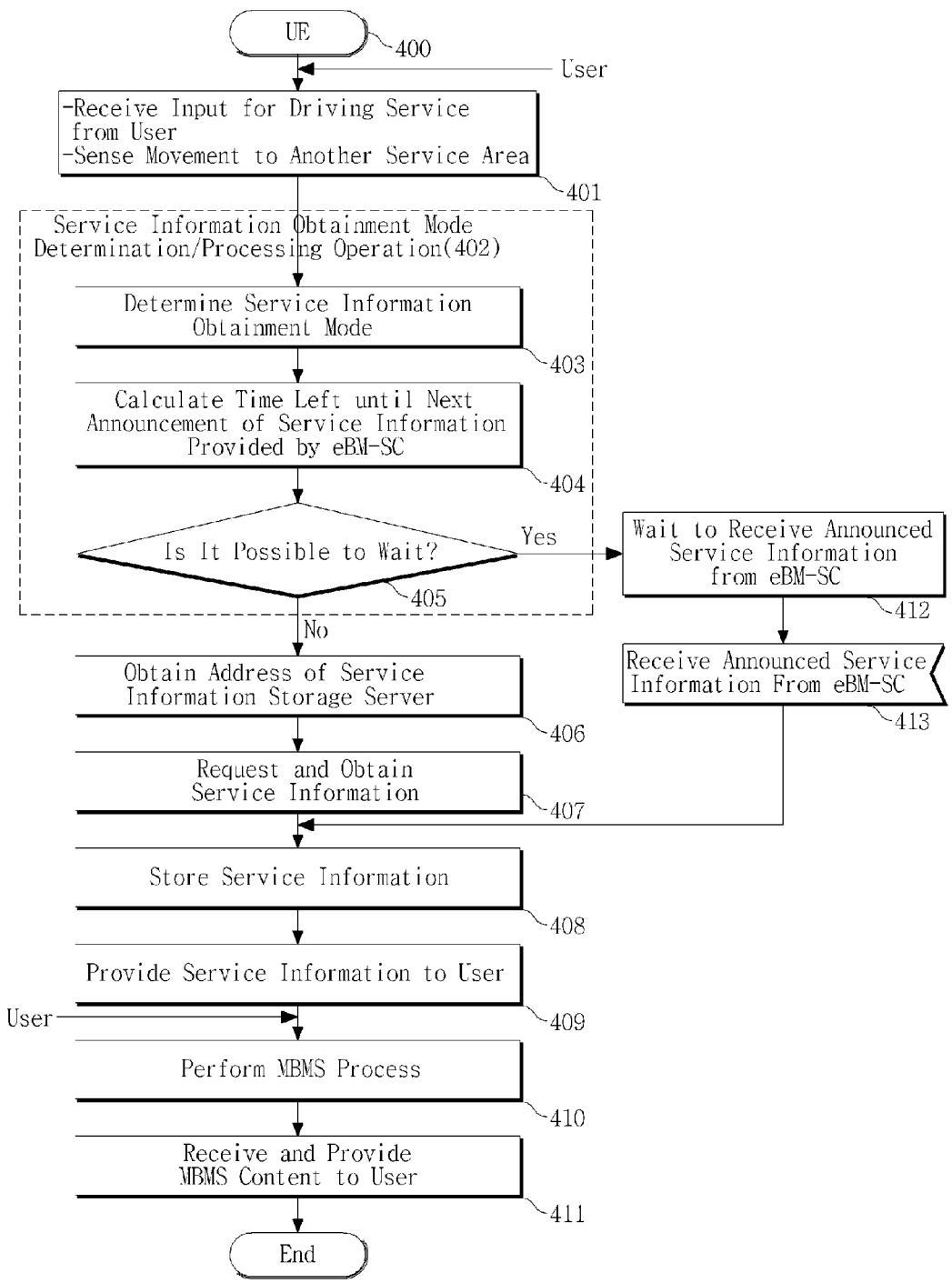
FIG. 4 is a flowchart illustrating a service information obtainment method that can be performed by a mobile terminal according to an exemplary embodiment.

FIG. 4 is a flowchart illustrating a service information obtainment method that can be performed by the UE 201 according to an exemplary embodiment. To be specific, FIG. 4 illustrates a method of obtaining service information in the mixed mode.

Referring to FIG. 4, the UE 201 determines whether driving of an MBMS is selected by a user, or whether it moves from a SA to another SA (operation 401). When it is determined that a user requests driving of the service or the UE 201 moves between SAs, the UE 201 performs a service information obtainment mode determination and processing operation (operation 402).

In the service information obtainment mode determination and processing operation (operation 402), the UE 201 first reads a set service information obtainment mode (operation 403). For example, when the service information obtainment mode is set to the passive mode, the UE 201 waits for the eBM-SC 207 to periodically announce service information as described above. This is a general method. When the service information obtainment mode is set to the terminal mode, the UE 201 requests transmission of service information in response to a user request or terminal request, and obtains service information. However, when the service information obtainment mode is set to the mixed mode, the UE 201 performs the following operations 404 and 405.

The UE 201 calculates a time left until next announcement of service information provided by the eBM-SC 207 (operation 404). When the calculated time is within the range of a time in which it is possible to wait to receive service information, that is, a service information reception time range, the UE 201 waits to receive service information announced by the eBM-SC 207 (operation 412). When service information announced by the eBM-SC 207 at predetermined periods is received while the UE 201 waits to receive announced service information (operation 413), the UE 201 performs the following operation 408. Here, the service information reception time range is a predetermined value. In order to provide the best service, the service information reception time range may be set close to a time taken for the UE 201 to request service information from the eBM-SC 207 and obtain it.

When it is determined in operation 405 that it is impossible to wait until service announcement is made by the eBM-SC 207, the UE 201 obtains the address of the service announcement server 209 to request service information by itself (operation 406). The address may be a value stored in advance by a user, and so on. The UE 201 transmits a service information request to the service announcement server 209 using the obtained address of the server 209 and receives the response (operation 407), thereby obtaining desired service information. Here, service information can be requested and obtained using a hypertext transport protocol (HTTP) when the server 209 is a web server, and using a WAP when the server 209 is a WAP server.

The UE 201 obtaining service information as described above stores the service information in a memory means therein (operation 408), and provides the service information (operation 409) such that a user can select a service through a user interface (UI). When the user selects one of services, the UE 201 performs an MBMS procedure designated to provide the service (operation 410). When a bearer for transferring traffic is set up and a path is open through the MBMS procedure, content provided through the service is transferred to the UE 201 and provided to the user (operation 411).

As described above, when the UE 201 determines that the service information obtainment mode is the mixed mode, it checks a time at which the eBM-SC 207 announces service information next time, and waits to receive service information or immediately requests transmission of service information such that the processing load of a service center system and resource occupancy in a wireless resource section can be reduced.

Figure 5:
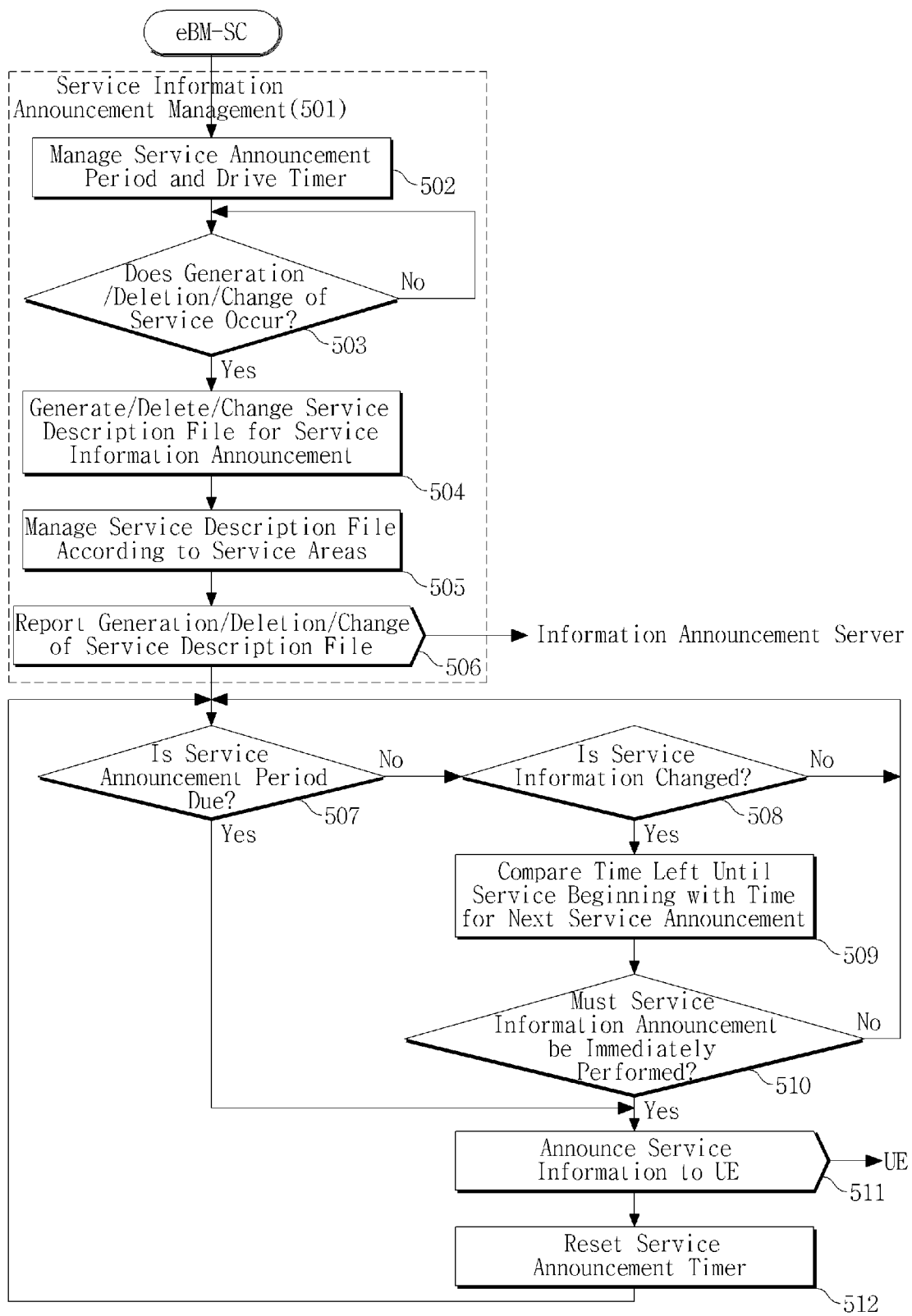
FIG. 5 is a flowchart illustrating a method of announcing service information according to an exemplary embodiment.

FIG. 5 is a flowchart illustrating a method of announcing service information according to an exemplary embodiment. To be specific, FIG. 5 is a flowchart illustrating a service information announcement method that can be performed by the eBM-SC 207.

Referring to FIG. 5, the eBM-SC 207 performs a service information announcement management function to provide a service information announcement service of transferring service types that the UE 201 can receive in the corresponding region, a type of content to be received from the corresponding service, and parameters required for communication (operation 501).

To this end, the eBM-SC 207 manages an announcement period for announcing service information and drives a timer for managing the announcement period, thereby performing the service information announcement function periodically (operation 502).

Also, the eBM-SC 207 stores and manages service information registered online or offline. In other words, the eBM-SC 207 monitors generation of a new service, deletion of an old service, and change in a registered service, and when such an event occurs (operation 503), it generates, stores and manages service description files about respective services to announce service information (operations 504 and 505). The service description files are service information, and separately managed according to SAs.

Meanwhile, the eBM-SC 207 reports information relating to generation/deletion/change of service description files to the service announcement server 209 as service information such that a change in service information can be reflected in the service announcement server 209 (operation 506). When the service announcement period is due based on the service information announcement management function (operation 507), the eBM-SC 207 performs operation 511, and when a change is made in the service information (operation 508), the eBM-SC 207 determines whether or not to transmit the service information to the UE 201 (operation 509). This is intended to check how long it is until service announcement is next scheduled without directly performing a service announcement process when a change is made in service information. When it is determined in operation 510 that it is possible to wait because the remaining time is short, the eBM-SC 207 ignores the corresponding event, keeps the service information changed, and announces the service information according to the announcement period. Here, a reference time to determine whether or not to wait until periodic service announcement without performing service announcement depending on an event may be changed using system data. When it is determined in operation 510 that service information announcement must be immediately performed, the eBM-SC 207 performs operation 511.

The eBM-SC 207 transmits and announces changed, deleted or generated service information to the UE 201 (operation 511), and resets the service announcement timer (operation 512) such that service information can be transmitted at the next period. Here, the eBM-SC 207 may be required to perform a control process of setting up an EMBMS broadcast/multicast bearer or performing a CBS procedure in order to transfer service information to the UE 201. However, the process does not directly relate to exemplary embodiments, and thus its detailed description will be omitted.

As described above, when service information is changed, the eBM-SC 207 announces the changed service information to the service announcement server 209, determines whether to announce the changed service information at regular announcement periods or immediately, and announces the changed service information to the UEs 201 located in the corresponding SA, thereby rapidly informing the UEs 201 that the service information is changed. The service announcement periods can be dynamically changed by an administrator terminal.

Figure 6:
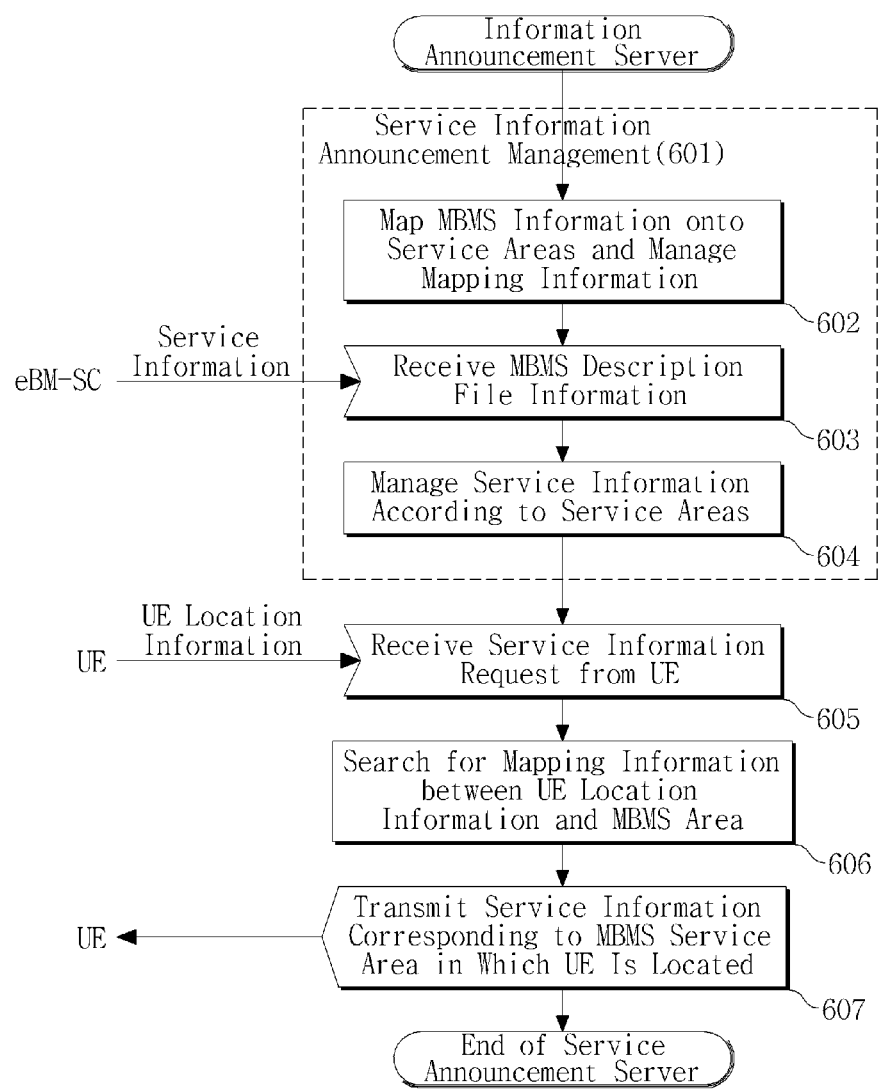
FIG. 6 is a flowchart illustrating a service information announcement method that can be performed by a service announcement server according to an exemplary embodiment.

FIG. 6 is a flowchart illustrating a service information announcement method that can be performed by the service announcement server 209 according to an exemplary embodiment.

The service announcement server 209 performs a service information announcement management function for maintaining service information in association with the eBM-SC 207 (operation 601). In other words, the service announcement server 209 maps, stores, and manages MBMS information providable according to SAs that are sets of cells in advance (operation 602). And, the service announcement server 209 receives service information (i.e., MBMS description files) changed according to the SAs from the eBM-SC 207 (operation 603). Then, the service announcement server 209 stores and manages the received service information according to the SAs (operation 604). After this, when the UE 201 transmits its location information and requests transmission of service information (operation 605), the service announcement server 209 searches for a relationship between the location information and an MBMS area (operation 606). Subsequently, the service announcement server 209 announces the searched result, that is, service information corresponding to an MBMS area in which the UE 201 is located to the UE 201 (operation 607).

The UE 201 obtaining the service information stores it in a memory means therein and provides it such that a user can select one of services through a UI. When the user selects one of services, an MBMS process designated to provide the service is performed such that content selected by the user is transferred to the UE 201 and provided to the user.

As described above, the exemplary embodiments use a method in which a service center unilaterally announces service information together with a method in which a service center announces service information in response to a request of a terminal. Thus, it is possible to reduce the processing loads of a mobile communication network and terminal relating to service information announcement, and power of the terminal. Also, resources in the wireless section of the mobile communication network can be efficiently managed.

The present invention can be implemented as computer readable codes in a computer readable record medium. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

As apparent from the above description, when a method in which a service center unilaterally announces service information and a method in which a service center announces service information in response to a terminal's request are applied together, a terminal can request and obtain service information, not at specific periods, but at an event requiring information, that is, when service is activated by a user or the user moves to another SA. Thus, information about service available in the corresponding area can be rapidly obtained. Also, when service information is changed in a service center, it is announced to terminals in a SA that service information is changed. Thus, it is possible to prevent an increase in system processing load and waste of wireless resources that may be caused when a terminal requests service information in relatively short time intervals to obtain the changed service information. Furthermore, since a terminal can request service information according to necessity, a service center can extend a service announcement period. Consequently, a processing load and resource occupancy in a wireless resource section may be reduced.

In addition, service information changed in a service center is transmitted to a service announcement server and shared, and thus a terminal can obtain the changed service information through the service announcement server. Consequently, the processing load of a service center system may be reduced.

It will be apparent to those of ordinary skill in the art that various modifications can be made to the exemplary embodiments of the invention described above. However, as long as modifications fall within the scope of the appended claims and their equivalents, they should not be misconstrued as a departure from the scope of the invention itself.

What is claimed is:

1. A method of obtaining multimedia broadcast/multicast service (MBMS) information to receive a broadcasting service in a user equipment (UE), the method comprising:
   checking whether or not a predetermined event occurs in order to obtain a list of services;
   determining whether the UE is in a passive mode in which the UE awaits service broadcasts from an external server or a terminal mode in which the UE requests the list of services from the external server,
   waiting to receive the list of services periodically announced by the external server when the service information obtainment mode is a passive mode, and requesting the external server to transmit the list of services in response to a user request and according to whether or not the event occurs when the UE is in the terminal mode; and
   receiving the list of services transmitted in response to the list of services transmission request, and outputting the list through a user interface (UI).

2. The method of claim 1, wherein location information of the UE is included in a message for the list of services transmission request.

3. The method of claim 1, wherein the event occurs when a user requests driving of an MBMS, or the UE moves to another service area.

4. A method of obtaining a list of services to receive a broadcasting service in a user equipment (UE), the method comprising:
   checking whether or not a predetermined event occurs in order to obtain the list of services;
   when the event occurs, determining a service information obtainment mode;
   when the service information obtainment mode is a mixed mode, determining, with the UE, whether to request an external server to transmit the list of services or wait to receive an announced list of services;
   according to the result of the determination operation, requesting the external server to transmit the list of services, or waiting to receive the announced list of services;
   waiting to receive the list of services periodically announced by the external server when the service information obtainment mode is a passive mode, and requesting the external server to transmit the list of services in response to a user request when the service information obtainment mode is a terminal mode; and
   receiving the list of services transmitted in response to the list of services transmission request or the list of services periodically announced by the external server, and outputting the list of services through a user interface (UI).

5. The method of claim 4, wherein the event occurs when a user requests driving of a multimedia broadcast/multicast service (MBMS), or the UE moves to another service area.

6. The method of claim 4, wherein location information of the UE is included in a message for the list of services transmission request.

7. The method of claim 4, wherein the event occurs when a user requests driving of a multimedia broadcast/multicast service (MBMS), or the UE moves to another service area.

8. The method of claim 4, wherein location information of the UE is included in a message for the list of services transmission request.

9. A service information announcement method performable in a service center in charge of multimedia broadcast/multicast service (MBMS) control, the method comprising:
   storing a list of services describing newly generated, deleted or changed services according to service areas;
   announcing the newly stored service-area-specific list of services to a service announcement server;
   when a service announcement period is due or a change is made in the list of services, announcing the changed list of services to a user equipment (UE) in a corresponding service area, wherein the UE waits to receive the list of services periodically announced by the service center when the UE is in a passive mode, and requests the service center to transmit the list of services in response to a user request when the UE is in a terminal mode; and
   providing the list of services to the UE in response to a request from the UE to provide the list of services.

10. The service information announcement method of claim 9, further comprising:
    when a change is made in the list of services, comparing a time left until service beginning with a time left until the list of services announcement; and
    determining whether to immediately announce the list of services or wait until the service announcement period is due according to the result of the comparison operation.

11. The service information announcement method of claim 10, wherein the service announcement period can be dynamically changed by an administrator terminal.

12. The service information announcement method of claim 9, wherein the service announcement period can be dynamically changed by an administrator terminal.

13. A service information announcement method performable in a server interoperable with a service center in charge of multimedia broadcast/multicast service (MBMS) control, the method comprising:

mapping, storing, and managing MBMS information providable according to service areas that are sets of cells;

receiving a list of services newly changed according to the service areas from the service center, and updating service-area-specific MBMS information;

receiving a service information request message from a user equipment (UE), wherein the UE waits to receive the list of services periodically announced by the server when the UE is in a passive mode, and requests the server to transmit the list of services in response to a user request when the UE is in a terminal mode;

searching for service information requested by the UE based on location information of the UE, and transmitting the list of services to the UE; and periodically broadcasting the list of services to the service areas.

14. The service information announcement method of claim 13, wherein the service information request message includes at least the location information of the UE, and the MBMS information of a service area in which the UE is located is searched for using the location information.

* * * * *